Sept. 22, 1959     W. M. NONNAMAKER     2,905,221
VALVE CONSTRUCTION

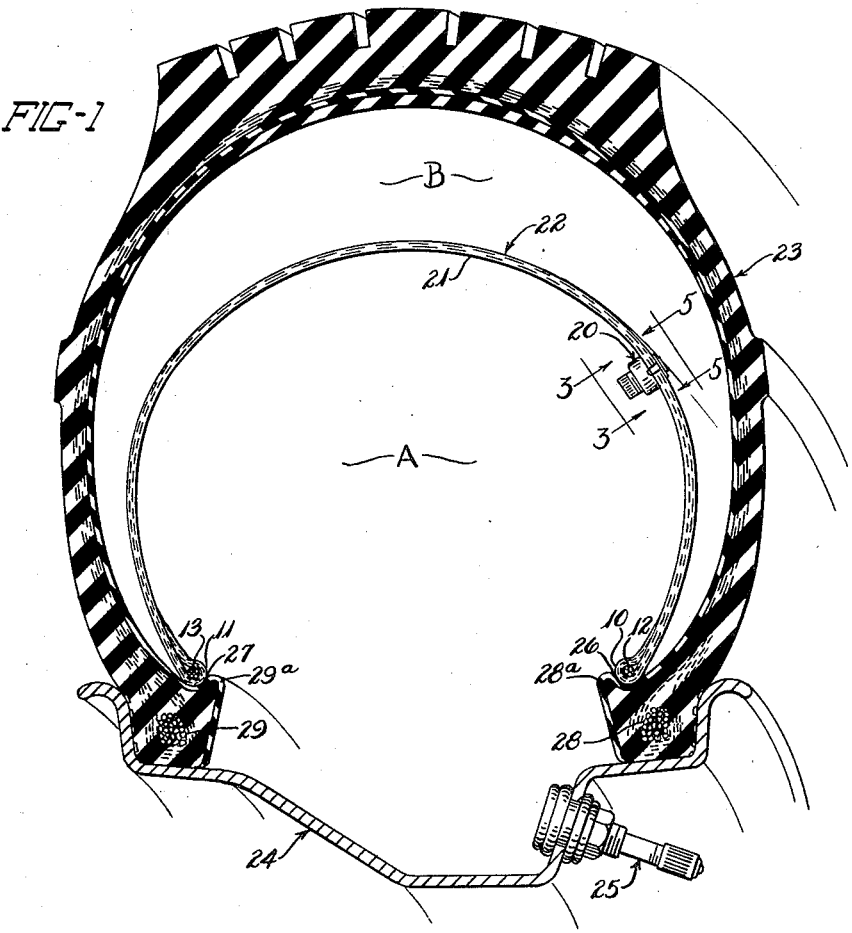
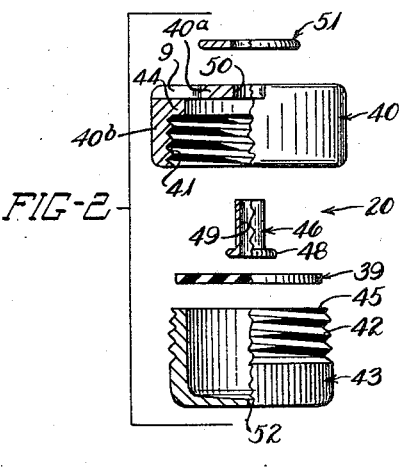
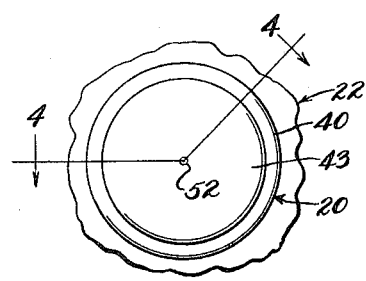

Filed June 25, 1954                       3 Sheets-Sheet 2

INVENTOR.
WILLIAM M. NONNAMAKER
BY W. A. Fraser
ATTY.

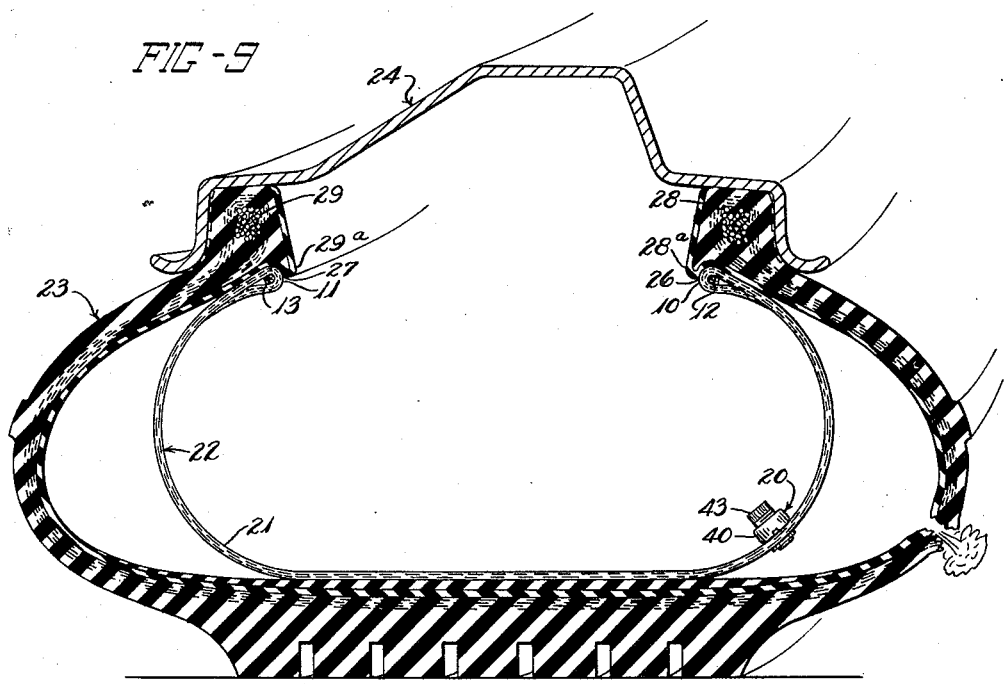

United States Patent Office 2,905,221
Patented Sept. 22, 1959

2,905,221

VALVE CONSTRUCTION

William Max Nonnamaker, Cuyahoga Falls, Ohio, assignor to The Firestone Tire & Rubber Company, Akron, Ohio, a corporation of Ohio Application June 25, 1954, Serial No. 439,329

3 Claims. (Cl. 152—341)

This invention relates to valves of the type employed to provide controlled flow of the inflationary medium between two or more compartments of safety tubes or tires. Presently, such valves are commonly used in combination with safety tubes of the type formed into an inner and an outer container separated by a thin wall in which wall the valve is disposed. Valves of that type are designed to permit tire inflationary air entering the inner container to pass through said valves into the outer container and equalize the pressure on both sides of said wall. These valves are responsive to fluid pressure differential between said containers and are designed to close in the event of a sudden loss of inflationary air from said outer container all as will be understood by reference to United States Patents Numbers 2,404,578 and 2,308,955, to which reference is made for a more detailed explanation of the structure and manner of functioning of prior valves used for the same general purpose as is the present valve described hereinafter.

The use of tubeless automobile tires has recently increased substantially and one such type tire being sold in large volume comprises a safety member in the form of a removable wall or diaphragm extending from bead to bead of the tire forming an inner and outer air container within the tire. In this last mentioned construction a valve is disposed in said wall or diaphragm for the purpose of passing inflationary air from the inner to the outer container during inflation of the tire and to close and prevent or control the escape of air from the inner container in the event of a tire blowout or large tire puncture, and in this respect serves the same purpose as the valves disclosed in the above referred to patents. The present invention will be illustrated in relation to a tubeless tire separated into an inner and outer air container as just explained.

Valves heretofore known and used for the purpose of applicant's valve have not been entirely satisfactory, principally because to produce uniformly satisfactory valves required manufacturing controls beyond practical operating conditions which resulted in valves being used that would not function as intended. Since the rubber or rubber-like material of which the said prior art valves as disclosed by said patents are at least partially composed must be pliable enough to close the valve when air flows through rapidly and stiff enough to prevent the valve closing when the flow of air is not so rapid, it will be seen that in valves of the prior art construction, the control of the pliability of the rubber is critical within a narrow range. The pliability or stiffness of a rubber element in those valves is affected by the original modulus of the rubber, the shape, thickness and aging characteristics after molding. Obviously, the molds in which the rubber parts are molded will vary and no two batches of compound will produce rubber with the same modulus throughout a given batch of rubber. These, and other variables that will be manifest to those familiar with rubber manufacturing, have resulted in a need for a valve so constructed that its proper functioning will not be prevented by the normal variations of manufacturing the rubber parts thereof.

It is an object of the present invention to provide a valve adapted for use to control the flow of inflationary air through the inner wall of a safety tube or tire that will not close during normal inflation of a tire and will close to the extent desired in the event of rapid loss of air from an outer container of such tube or tire.

Another object of the invention is to provide a valve for the purpose stated in the next preceding paragraph which valve is so constructed that normal manufacturing variations do not prevent the valve from functioning.

Another object of the invention is to provide a valve for the purpose described that is economical, simple to manufacture and may be conveniently incorporated in the safety wall of an inner tube or the safety wall of a tubeless tire.

Referring to the drawings:

Fig. 1 is a fragmentary perspective view partly in section showing a combination embodying the present invention, and comprising a tubeless tire mounted on its rim and a safety diaphragm, which includes a diaphragm valve, mounted in the tire, the view being taken at an area removed from the tire's contact with the road;

Fig. 2 is an exploded view of the diaphragm valve shown in Fig. 1;

Fig. 3 is a plan view taken on line 3—3 of Fig. 1;

Figure 7:
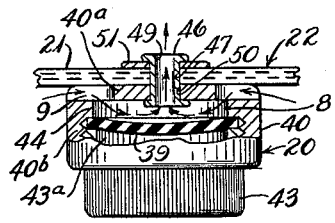
Fig. 7 is a view, partly in section, of the valve illustrating the relative positions of the elements of the valve during inflating of the tire.
Figure 8:
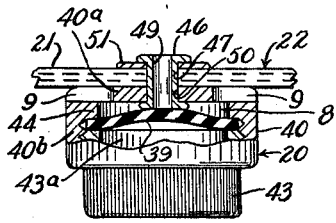

Fig. 8 is the same as Fig. 7 except the relative position of the elements are shown as they occur when the valve has closed as a result of a differential air pressure between the inner and outer containers created by a rapid loss of air from the outer chamber; and Fig. 9 is a sectional view similar to Fig. 1 illustrating the relative position of the elements of said combination at the tire road contact portion of the tire when the outer container has suddenly lost its inflationary air and the safety wall is functioning as an auxiliary tire load-carrying means.

The present invention is illustrated in relation to a tubeless pneumatic tire 23 of the open-beaded type having removably mounted therein an auxiliary load-carrying member 22 that is adapted to divide the tire into an inner and an outer container A and B respectively and to carry the tire load in the event of a tire blowout. Tire 23 has bead portions 28 and 29 with seats 26 and 27 respectively in the form of continuous radially outwardly opening grooves disposed in shoulders 28a and 29a respectively formed integrally with and disposed on the laterally inward portion of bead portions 28 and 29 respectively as will be seen by reference to Fig. 1. The wall 21 of diaphragm 22 is substantially impervious to the inflationary air of the tire and may be composed of two plies of rubberized rayon cord fabric anchored at their edge portions 10 and 11 to inextensible annular beads 12 and 13 respectively in similar manner as automobile tire plies are anchored to their beads.

The tire 23 with the diaphragm 22 in operative position therein is mounted on tire rim 24 as shown in Fig. 1. Rim 24 has associated therewith in fluid tight relation an inflating valve 25 of the type used in conventional pneumatic tire inner tubes.

Inflationary air is passed into tire 23 through valve 25 first into the inner container A formed by diaphragm 22, bead shoulders 28a, 29a and the rim 24 and then through the wall of diaphragm 22 into the outer container B defined by the tire 23 and diaphragm 22.

Figure 4:
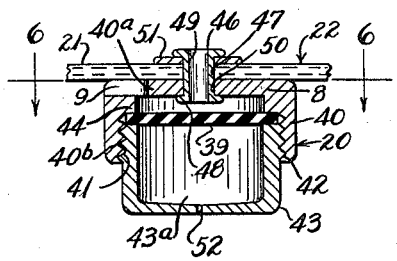
Fig. 4 is a sectional view taken on line 4—4 of Fig. 3.
Figure 5:
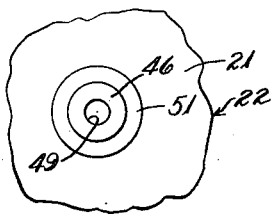
Fig. 5 is a plan view taken on line 5—5 of Fig. 1.
Figure 6:
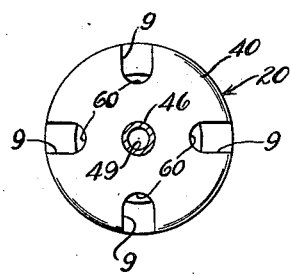
Fig. 6 is a view taken on line 6—6 of Fig. 4.

The passage of air into the outer container is through a valve referred to generally as 20, the same being attached to the diaphragm wall 21 and providing air communication between said containers as will later be explained. Valve 20 comprises a cap-like nut 40 having a bottom 40a with a rivet hole 50 through the center thereof and a cylindrical side 40b with internal threads 41 adapted to receive in threaded relation the external threads 42 of a cap 43. Nut 40 has a shoulder 44 on which a circular pliable and elastic gasket 39, formed of rubber or rubbery material, is seated. As will be seen by reference to Fig. 4 the hollow rivet forms a conduit between the containers when the cap 43 is threaded into nut 40, the edge portion of gasket 39 is gripped between shoulder 44 and the edge 45 of cap 43 thus providing a chamber 43a defined by gasket 39 and cap 43. A hollow metal rivet 46 is disposed in a rivet hole 47 and 47a in wall 21 and nut bottom 40a respectively and rivets nut 40 to said wall as best shown in Fig. 4. The head 48 of said rivet provides a valve seat for gasket 39 about the hole 49 through the rivet. Gasket or disk 39 normally is spaced from its seat on rivet head 48 approximately $\frac{1}{32}''$. For passenger car tires, applicant has found a passageway through the rivet of $\frac{1}{8}''$ dia. to be satisfactory. It will be noted by further reference to the drawings that valve 20 is disposed on the radial inner side of diaphragm 22, said rivet having head 48 and of sufficient length to extend through a rivet hole 50 in nut 40, rivet hole 47 in wall 21 and to project a distance of approximately $\frac{3}{32}''$ beyond wall 21 thus providing an air passageway through nut 40 and wall 21. To apply valve 20 the rivet is inserted in the rivet hole 50 provided in nut 40 with rivet head 48 in contact with the wall of the nut. Next, the assembled nut and rivet is placed with the nut against the radially inner surface of diaphragm 22 and the rivet extending through hole 47 and beyond wall 21. A rigid washer 51 is placed about said projecting end of the rivet after which said projecting end is spun or otherwise turned radially outwardly and downwardly against washer 51 whereby the valve 20 is riveted into operative position in the diaphragm 22. The cap 43 is provided with a small aperture 52 (see Fig. 3) of approximately .002'' in diameter. While applicant has found that the threads 41 and 42 retain their threaded relation during normal service of a tire, it is to be understood that valve 20 may be assembled with a sealing compound on said threads if found desirable. The cap and disk may be assembled with the base after the base 40 has been riveted to diaphragm wall 21. It is also pointed out that while applicant prefers to control the flow of air entering chamber 43a in cap 43 by regulating the size of aperture 52, other means of controlling such flow into said cap will be manifest to those familiar with the art and such obvious methods, as for example, but without limitation, by loose fitting threads or by-passing air by the edge of or through the diaphragm, are within the contemplation of the present invention.

It will be seen that nut 40 and cap 43 when assembled (Fig. 4) form a fluid chamber divided into inner and outer compartments by the resilient disc shaped gasket 39. The inner compartment is defined by nut 40 and gasket 39, while the walls of the outer compartment are defined by cap 43 and gasket 39.

A passageway for air from inner chamber A to outer chamber B through valve 20 comprises notches 9 opening at the circumference of bottom 40a of nut 40 and extending radially inwardly beyond the side 40b of said nut thereby providing holes 60 which holes communicate with a chamber 8 defined by gasket 39, nut 40 and rivet 46. Chamber 8 communicates with outer chamber A during inflation of tire 23.

The operation of the valve and the assembly will now be explained.

With the tire 23, diaphragm 22, rim 24 with valves 20 and 25 in position as shown in Fig. 1, inflationary air is passed into the inner container A through valve 25 in the usual manner of inflating tires. The gasket 39 of valve 20 is normally spaced from the head 48 of rivet 46 so that the inflationary air entering container A will pass through notches 9 and holes 60 into chamber 8 and then through hollow rivet 46 into outer container B. The passageway through valve 20 has an effective cross-sectional area which is preferably slightly greater than the cross-sectional area of the primary inflating valve 25. In considering the effective cross section of the passageway through which the inflationary air passes, the pressure to which these valves are subjected is taken into consideration. For instance, if the physical area of the valve 25 and the valve 20 were exactly the same, the effective cross-sectional area of the valve 25, for all practical purposes, would be greater than that of the valve 20 because the inflating valve 25 will be subjected to the total pressure of the sources of inflating fluid. If the areas are equal and the valve 25 is connected to an external source of high fluid pressure, a pressure differential will develop between the inner and outer containers. It is definitely an object of the invention to avoid this. For this reason, the cross-sectional area of the passage through valve 20 into the outer container is enough larger than the area of valve 25 to insure that no substantial fluid pressure differential between the two containers will develop when the tire is inflated from an external source. In prior art valves, referred to hereinabove, and other known valves adapted to be used for the purpose of applicant's valve, flow of inflationary air through the wall or diaphragm separating the inner and outer containers was not free of danger of the valve closing during inflation When this occurred, there was no way of determining through the medium of tire gauges the internal pressure within the outer container. Premature closing of the valve through which inflationary air passes to the outer container often resulted in the tire being run under-inflated or required the complete deflation of the tire and reinflation at such reduced speed of inflation that the particular valve being used did not close during inflation Applicant overcomes this fault of prior valves by providing a very small aperture 52 in cap 43 and a larger air passageway through notches 9 and holes 60 into chamber 8 resulting in the air pressure on the rivet side of gasket 39 building up faster than on the cap side of this gasket, which results in the gasket being pressed away from its seat against rivet head 48 as will be seen by reference to Fig. 7. Applicant's valve structure subjects the gasket 39 to a differential fluid pressure during inflation that stretches the gasket away from its closing position against the rivet and makes applicant's valve completely immune from closing during inflation. As soon as the entrance of inflationary air through valve 25 is stopped, the pressure in containers A and B is equalized and the air from container A will continue to flow through aperture 52 until the fluid pressure on both sides of elastic gasket 39 is equalized and the gasket will return to its normal position shown in Fig. 4.

In the event that tire 23 of said assembly is subjected to a blowout or rapid loss of air from container B in service, the inflationary air within container A immediately starts to rush through valve 20. Since a tire blowout or a large rupture of the tire permits the sudden escape of air from container B, a differential fluid pressure is created on the opposite sides of the wall 21 of the diaphragm 22, gasket 39, and the gasket 39, being pliable, is immediately drawn or forced against its seat on rivet head 48 closing the passageway 49 through the hollow rivet 46, trapping the inflationary air in container A. The relative position of the tire and the safety diaphragm at the tire road contact surface is illustrated in Fig. 9 by reference to which it will be seen that the diaphragm 22 becomes an auxiliary tire load-carrying member that supports the tire at a height sufficiently removed from the tire rim to prevent loss of control of the automobile and make it possible to bring same to a safe stop or to proceed slowly without further injury to the tire. Although the diaphragm will support a blown out tire at a point removed from the rim sufficient for a driver of an automobile to proceed safely, it is obvious that the tire is substantially under-inflated and for that reason, it may be desirable to provide a slow leak through the valve 20 or by the diaphragm bead seats 26 or 27 to prevent driving of the substantially deflated tire a long distance.

It is to be understood that applicant's valve is useful for association with the walls of any type of multiple container fluid containers in which the fluid passes from one container to the other and it is desirable to prevent communication between the containers in the event of the rapid loss of fluid from one or more containers. An example of such use would be in multiple chamber fuel cells for military airplanes to prevent complete loss of gasoline in the event of a rupture of the wall of one or more chambers as by gun fire. Storage tanks may use the present invention to reduce loss of fluid when the walls of such tanks become injured or burst. The present valves are also useful for use in combination with the walls of bulkheads or inflatable cells of inflatable boats.

The detailed description of the particular embodiments of the invention illustrated and described herein is not to be construed as limiting the invention thereto. The invention includes all features of patentable novelty residing in the foregoing description and the accompanying drawings.

What is claimed is:

1. A valve for controlling flow of fluid between two fluid pressure containers, comprising a hollow rivet defining a conduit, means defining a fluid chamber connected in fluid communication with said conduit, resilient means anchored to the walls of said chamber defining means to divide said chamber into an inner compartment including a portion of said conduit and an outer compartment remote from said conduit, a passage in the wall of said chamber defining means adapted to provide fluid communication between the inner compartment and one container, a second passage of less cross-sectional area than said first passage in the wall of said chamber adapted to provide fluid communication between the outer compartment and said one container, said resilient means adapted to extend to and seal against the end of the conduit when fluid pressure in the outer compartment is greater than fluid pressure in the inner compartment to thereby seal the conduit against escape of fluid.

2. A valve for controlling flow of fluid between two fluid pressure containers, comprising a hollow rivet defining a conduit, means on the end of and in fluid communication with said conduit and protruding into one container to define a fluid chamber, resilient means anchored to the walls of said chamber defining means dividing said chamber into an inner compartment including the end of said conduit and an outer compartment remote from said conduit, a passage in the wall of said chamber adapted to provide fluid communication between the inner compartment and said one container, a second passage of less cross-sectional area than said first passage in the wall of said chamber adapted to provide fluid communication between the outer compartment and said one container, said resilient means adapted to extend to and seal against the end of the conduit when fluid pressure in the outer compartment is greater than fluid pressure in the inner compartment to thereby seal the conduit against escape of fluid.

3. A valve for controlling flow of fluid between two fluid pressure containers, comprising a hollow rivet defining a conduit, a cylindrical member with closed ends in fluid communication with said conduit and protruding into one container to define a cylindrical fluid chamber, a resilient disc anchored to the walls of said body at its peripheral edge to divide said chamber into an inner compartment including the end of said conduit and an outer compartment remote from the end of said conduit, a passage in the wall of the body of said fluid communicating means between the inner compartment and said one container, a second passage of less cross-sectional area than said first passage in the wall of said body communicating between the outer compartment and said one container, said resilient disc adapted to extend to and obstruct the conduit when fluid pressure in the outer compartment is greater than fluid pressure in the inner compartment to thereby seal the conduit against escape of fluid from the one container.

References Cited in the file of this patent

UNITED STATES PATENTS

| | | |
|---|---|---|
| 2,216,368 | Hollingshead | Oct. 1, 1940 |
| 2,583,384 | Mercier | Jan. 22, 1952 |
| 2,665,732 | Slezak | Jan. 12, 1954 |
| 2,674,261 | Wilson | Apr. 6, 1954 |

FOREIGN PATENTS

| | | |
|---|---|---|
| 578,007 | France | June 20, 1924 |